US010225763B2

(12) United States Patent
Li et al.

(10) Patent No.: US 10,225,763 B2
(45) Date of Patent: Mar. 5, 2019

(54) METHOD AND APPARATUS FOR RE-TRANSMITTING DATA

(71) Applicant: NTT DoCoMo, Inc., Tokyo (JP)

(72) Inventors: Anxin Li, Beijing (CN); Huiling Jiang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 244 days.

(21) Appl. No.: 15/044,410

(22) Filed: Feb. 16, 2016

(65) Prior Publication Data
US 2016/0269933 A1   Sep. 15, 2016

(30) Foreign Application Priority Data

Mar. 12, 2015   (CN) .......................... 2015 1 0107982

(51) Int. Cl.
| | |
|---|---|
| H04W 28/06 | (2009.01) |
| H04L 1/18 | (2006.01) |
| H04W 52/24 | (2009.01) |
| H04W 72/12 | (2009.01) |
| H04W 52/34 | (2009.01) |

(52) U.S. Cl.
CPC ......... *H04W 28/065* (2013.01); *H04L 1/1825* (2013.01); *H04L 1/1845* (2013.01); *H04W 52/241* (2013.01); *H04W 52/34* (2013.01); *H04W 72/1226* (2013.01)

(58) Field of Classification Search
None
See application file for complete search history.

(56) References Cited

U.S. PATENT DOCUMENTS

| | | | | |
|---|---|---|---|---|
| 2005/0022097 | A1* | 1/2005 | Cheng ................... | H04L 1/1816 714/774 |
| 2008/0192683 | A1* | 8/2008 | Han ...................... | H04B 7/0417 370/329 |
| 2009/0044065 | A1* | 2/2009 | She .......................... | H04L 1/06 714/748 |
| 2014/0161057 | A1* | 6/2014 | Hejazi ................. | H04W 52/243 370/329 |

(Continued)

OTHER PUBLICATIONS

European Search Report dated Aug. 16, 2016.

*Primary Examiner* — Kashif Siddiqui
*Assistant Examiner* — Mehedi S Aley
(74) *Attorney, Agent, or Firm* — Harness, Dickey & Pierce, P.L.C.

(57) ABSTRACT

The present disclosure provides a method for re-transmitting data, wherein the method at a User Equipment (UE) side comprises: receiving, by a UE, a re-transmitted data packet from a base station, determining whether to perform data combination according to a Signal to Interference-Noise Ratio (SINR) of a first-transmitted data packet and a SINR of the re-transmitted data packet; when it is determined to perform data combination, performing, by the UE, data combination for the re-transmitted data packet according to information buffered by the UE and detecting the re-transmitted data packet according to a result of performed data combination; or when it is determined not to perform data combination, detecting, by the UE, the re-transmitted data packet. The present disclosure also provides a method for re-transmitting data at a base station side and a UE for implementing the above method.

12 Claims, 4 Drawing Sheets

(56) References Cited

U.S. PATENT DOCUMENTS

2015/0098415 A1* 4/2015 Chen .................. H04L 5/0035
                                                              370/329
2017/0141886 A1* 5/2017 Chung ................ H04L 5/006
2017/0222862 A1* 8/2017 Li ....................... H04W 4/70
2017/0338915 A1* 11/2017 Kim .................... H04L 1/1835

* cited by examiner

METHOD AND APPARATUS FOR RE-TRANSMITTING DATA

This application claims the benefit of priority from Chinese Patent Application, No. 201510107982.9, entitled "method and apparatus for re-transmitting data" and filed on Mar. 12, 2015, the entire content of which is hereby incorporated by reference.

FIELD OF THE DISCLOSURE

The present disclosure relates to a wireless communication system, and more particularly to a method and apparatus for re-transmitting data in a multiple user transmission system.

BACKGROUND

In a multiple user transmission system, through allocating transmission resources appropriately, data may be transmitted to multiple users simultaneously so as to improve data transmission efficiency. For example, in a Multiple User Multiple Input Multiple Output (MU-MIMO) system, via multiple layers in spatial domain, a base station may serve multiple users simultaneously.

Especially, due to limited spectrum resources, Non-Orthogonal Multiple Access (NOMA) has been more and more focused by people since NOMA is able to greatly improve the spectrum efficiency. The basic idea of NOMA is to perform non-orthogonal transmission at the transmitter, introduce interference intentionally, and detect data by a Sequential Interference Cancellation (SIC) technology at the receiver. Although SIC processing may increase complexity at the receiver, the spectrum efficiency can be greatly improved.

SUMMARY

The present disclosure provides a method for apparatus for re-transmitting data, to achieve downlink data re-transmission in a multiple user transmission system.

According to an example of the present disclosure, a method for re-transmitting data at a UE side comprises:

receiving, by a User Equipment (UE), a re-transmitted data packet from a base station, determining whether to perform data combination according to a Signal to Interference-Noise Ratio (SINR) of a first-transmitted data packet and a SINR of the re-transmitted data packet;

when it is determined to perform data combination, performing, by the UE, data combination for the re-transmitted data packet according to information buffered by the UE and detecting the re-transmitted data packet according to a result of performed data combination; or when it is determined not to perform data combination, detecting, by the UE, the re-transmitted data packet.

According to an example of the present disclosure, a method for re-transmitting data at a base station side comprises:

determining, by a base station, a re-transmitted data packet after a detection failure message is received from a User Equipment (UE);

performing, by the base station, user scheduling, determining another UE multiplexing a same resource with the UE corresponding to the re-transmitted data packet, and generating a user group comprising the UE and the determined another UE;

for each UE corresponding to the re-transmitted data packet in the user group, determining, by the base station, whether to perform data combination according to a Signal to Interference-Noise Ratio (SINR) of a first-transmitted data packet and a SINR of the re-transmitted data packet, and calculating a transmission power allocation factor corresponding to each UE in the user group according to a channel quality of each UE in the user group and a determination result after determining whether to perform data combination; and allocating, by the base station, power for a data packet of each UE according to the calculated transmission power allocation factor corresponding to each UE in the user group.

According to an example of the present disclosure, a User Equipment (UE) comprises:

a receiving module, configured to receive a first-transmitted data packet or a re-transmitted data packet from a base station;

a data combination module, configured to for the re-transmitted data packet, determine whether to perform data combination according to a Signal to Interference-Noise Ratio (SINR) of the first-transmitted data packet and a SINR of the re-transmitted data packet; when it is determined to perform data combination, perform data combination for the re-transmitted data packet according to information buffered by the UE;

a detecting module, configured to detect the first-transmitted data packet from the receiving module, and detect the re-transmitted data packet according to a result of performed data combination from the data combination module; and a feedback module, configured to feed back a detection failure message to the base station when the detecting module fails to detect a data packet; feed back a detection success message to the base station when the detecting module detects a data packet successfully.

DETAILED DESCRIPTION

As described above, NOMA is able to greatly improve the spectrum efficiency. However, because multiple users are scheduled simultaneously at each subband in the NOMA system, if data transmitted to one of the users is not detected successfully at the receiver, and data re-transmission is required, how to re-transmit data to a single UE from multiple user transmission point of view is one of the key problems that need to solve currently. Examples of the present disclosure provide a method and apparatus for re-transmitting data. The method and apparatus can be applied in a multiple user transmission system, e.g., a NOMA system.

In order to make technical solutions and merits of the present disclosure clearer, the present disclosure will be described in detail in combination with examples and accompanying drawings.

Currently, in a Long-Term Evolution (LTE) or Long-Term Evolution-Advanced (LTE-A) system, when data transmitted to one user is not detected successfully at the receiver, a Hybrid Automatic Repeat Request (HARQ) re-transmission mechanism may be used for re-transmitting data. However, the HARQ re-transmission mechanism specified in LTE/LTE-A system is designed with respect to a single user. But in a NOMA system, data may be transmitted for the first time and re-transmitted at a same subband, so that a more complex data re-transmission scheme in a NOMA system is required to perform buffering of received signals and HARQ data combination at the user side, transmission power allocation at the base station side, etc.

An example of the present disclosure provides a method for re-transmitting data, which is suitable for downlink data transmission in a NOMA system. In the present disclosure, for ease of description, a data packet transmitted by the base station for the first time is called as a first-transmitted data packet, and a data packet re-transmitted by the base station is called as a re-transmitted data packet.

Figure 1:
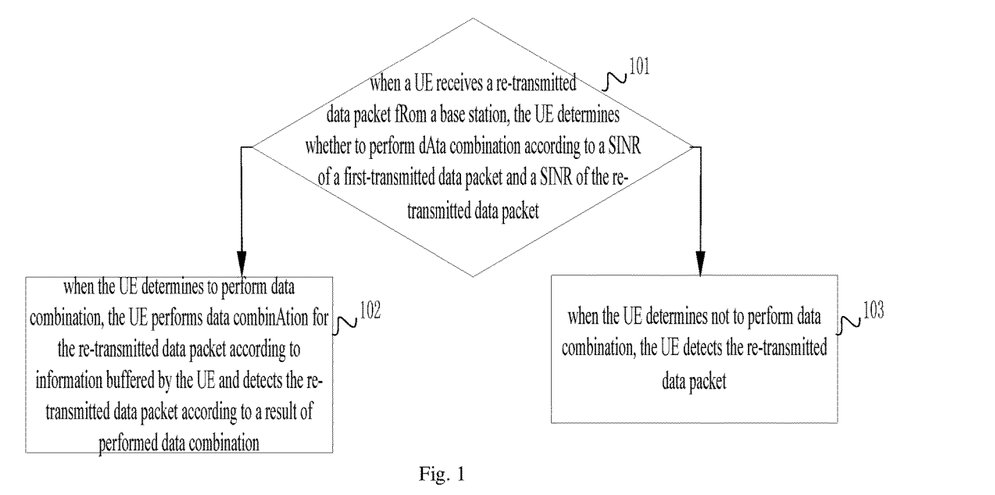
FIG. 1 is a flow chart illustrating a method for re-transmitting data at UE side according to an example of the present disclosure.

FIG. 1 is a flow chart illustrating a method for re-transmitting data according to an example of the present disclosure.

In block 101, when a UE receives a re-transmitted data packet from a base station, the UE determines whether to perform data combination according to a Signal to Interference-Noise Ratio (SINR) of a first-transmitted data packet and a SINR of the re-transmitted data packet.

In block 102, when the UE determines to perform data combination, the UE performs data combination for the re-transmitted data packet according to information buffered by the UE and detects the re-transmitted data packet according to a result of performed data combination.

In block 103, when the UE determines not to perform data combination, the UE detects the re-transmitted data packet.

Figure 2:
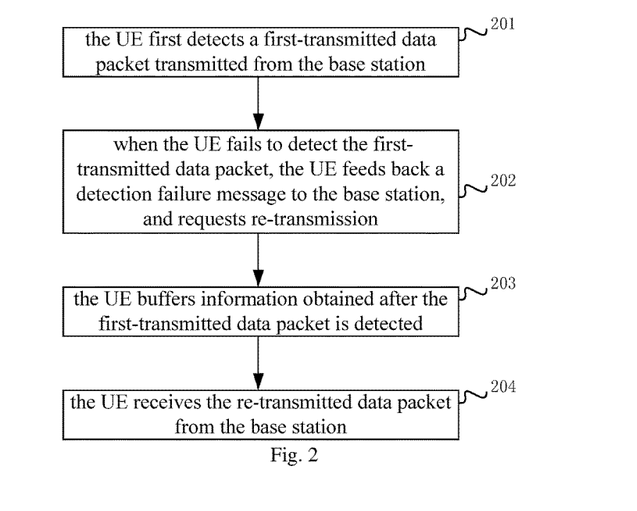
FIG. 2 is a flow chart illustrating a method for re-transmitting data at UE side according to an example of the present disclosure.

In an example, before performing block 101, the UE may first perform steps as shown in FIG. 2.

In block 201, the UE first detects a first-transmitted data packet transmitted from the base station.

In block 202, when the UE fails to detect the first-transmitted data packet, the UE feeds back a detection failure message to the base station, and requests the base station to re-transmit the data packet that the UE fails to detect, i.e., requests re-transmission, then continue to perform block 203.

In this block, when the UE detects the first-transmitted data packet successfully, the UE feeds back a detection success message to the base station, and does not request re-transmission, so that the procedure ends.

Figure 3:
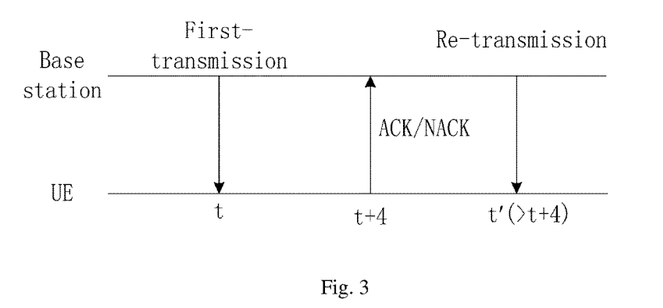
FIG. 3 is a schematic diagram illustrating timing sequence for re-transmitting data between a UE and a base station according to an example of the present disclosure.

In an example, as shown in FIG. 3, in the above-described block, assume the UE receives a downlink data packet from the base station at a time instant t. If the UE detects the first-transmitted data packet successfully, the UE may feed back a detection success message (e.g., a ACK message) to the base station at a time instant t+4; if the UE fails to detect the received data packet, the UE may feed back a detection failure message (e.g., a NACK message) to the base station at a time instant t+4, and requests the base station to re-transmit the data packet that the UE fails to detect a time instant t'.

In an example of the present disclosure, detecting the data packet successfully may be determined according to whether a result of Cyclic Redundancy Check (CRC) performed to the data packet is correct.

In block 203, the UE buffers information obtained after the first-transmitted data packet is detected.

In an example, the UE may detect the data packet by using SIC. In specific, two ways of SIC may be performed: A) symbol-level SIC: detecting data without channel decoding, and cancelling interference in the symbol level; B) codebook-level SIC: performing demodulation and channel decoding and obtaining the recovered data, and then re-encoding and modulating the recovered data, and cancelling interference. A) way of SIC may have a low complexity, but B) way of SIC may have better performance.

In the above-described block, the information buffered by the UE may include soft channel bits. The soft channel bits refer to a signal including noise (or interference), which is obtained after the received data packet is processed via SIC and comprises information related to channel status. For example, if a received signal is represented by $y=h*S+n$, where S is a signal for a user, h is a channel transfer function, and n is additive noise, a symbol or a bit metric obtained after soft demodulating y (i.e., without hard decision) is regarded as the soft channel bits, or, a bit metric obtained after demodulating and decoding y and before hard decision is regarded as the soft channel bits.

In another example, if a received signal in a NOMA system is represented by $y=h*(S1+S2)+n$, where S1 is a signal of UE1, S2 is a signal of UE2. Assume after performing SIC to S1, it is obtained: $z=h*S2+n+I(S1)$, where $I(S1)$ denotes a residual interference due to S1, thus a bit metric obtained after soft demodulating z is regarded as the soft channel bits, or, a bit metric obtained after demodulating and decoding y and before hard decision is regarded as the soft channel bits.

It should be noted that, the "channel" included in the soft channel bits refer to the channel between the base station and UE itself who receives the signal, but not includes a channel between the base station and a paired UE. From the UE who performs SIC point of view, the received signal includes a signal of the UE itself and a signal of a paired UE, which both propagates through a same wireless channel from the base station to the UE.

The soft channel bits buffered by the UE may be used for data combination for the re-transmitted data packet in the following steps. In addition, the duration for buffering the soft channel bits may be a whole data re-transmission procedure.

Further, in block 203, after the soft channel bits, does the UE need to buffer a data packet of another UE which is detected successfully by the UE?

Research shows that the gain from buffering a data packet of another UE which are detected successfully by the UE is much limited. For example, in a NOMA system, a user group scheduled in a subband includes: UE1 and UE2, and a SIC priority of UE1 is higher than that of UE2. When performing SIC, an order to detect multiple signals is called as a SIC order. The SIC order may be determined according to the UE's SIC priority in an ascending order. The basic principle is to first detect a weak user, and then detect a strong user. In specific, when performing SIC, first detect a signal of UE1 which has a low SINR (i.e., a weak UE) but is allocated with a large transmission power, the SIC priority of UE1 may be configured as 1; then, detect a signal of UE2 which has a high SINR (i.e., a strong UE) but is allocated with a small transmission power, the SIC priority of UE2 may be configured as 2. In addition, the SIC order is the same for UE1 and UE2.

Thus, only in one case, combination gain may be obtained from buffering a data packet of another UE which are detected successfully by the UE. That is, in the first transmission, UE1 does not detect the data packet of itself successfully, while UE2 detects the data packet of UE1 successfully, but UE2 does not detect the data packet of itself successfully. In the re-transmission, the base station re-transmits both data packet of UE1 and data packet of UE2 simultaneously, and UE2 does not detect the data packet of UE1 successfully. Because UE2 buffers the data packet of UE1 which UE2 detects successfully, UE2 may perform interference cancellation according to the buffered data packet of UE1 which UE2 detects successfully before, and then detect the data packet of itself, so that the combination gain may be obtained.

Those skilled in the art may appreciate that, in a practical application, the probability of the above-described scenario is much small. Hence, the gain from buffering a data packet of another UE which are detected successfully before by the UE is much limited. Instead, buffering a data packet of another UE requires some buffer space of UE itself. Therefore, in the examples of the present disclosure, when UE does not detect the data packet of itself successfully, UE may not be required to buffer the data packet of another UE detected successfully, or UE may buffer the data packet of another UE detected successfully before, but the buffering may happen only in a limited duration, for example, buffering the data packet until the first data re-transmission is finished.

In an example, the UE may determine whether buffering the data packet of another UE which is detected successfully when detecting the first-transmitted data packet according to the usage status of memory resources or the remained space in the buffer. For example, when the UE determines that the memory resources already used is beyond a pre-determined threshold, UE may select not buffering the data packet of another UE; otherwise, UE may select buffering the data packet of another UE detected successfully before, but only in a limited duration. For example, the pre-determined threshold is 60%.

In block 204, the UE receives the re-transmitted data packet from the base station.

In the examples of the present disclosure, when the base station performs user scheduling and determines the subband used for transmitting the re-transmitted data packet, the subband may be sent to UE via a control channel. Then UE may receive the re-transmitted data packet in the corresponding subband.

The following will describe in detail about determining whether to perform data combination according to a SINR of a first-transmitted data packet and a SINR of the re-transmitted data packet in block 101.

In an example, assume in a NOMA system, a user group scheduled in a subband includes: UE1 and UE2. At the base station, a first level modulation is used for the data packet of UE1, a second level modulation is used for the data packet of UE2, that is, a SIC priority of UE1 is higher than that of UE2. Because the channel of each UE is independent and time-variant, the correlative relationship between the channel quality of UE1 and the channel quality of UE2 is variant. For example, in the first transmission, channel condition of UE1 is good while channel condition of UE2 is bad, i.e., the SINR of UE1 in the first transmission is high while the SINR of UE2 is low, so that UE1 may detect the data packet of itself successfully, while UE2 may not detect the data packet of UE1 successfully and accordingly not detect the data packet of itself successfully.

When transmitting the re-transmitted data packet of UE2, the channel condition of UE2 becomes better, and a UE scheduled together with UE2 by the base station is UE3. The first level modulation is used for the data packet of UE3, and the second level modulation is used for the data packet of UE2. Due to better channel condition, for example, interuser interference becomes low for UE2, then UE2 may detect the data packet of UE3 and the data packet of itself successfully. In this case, if data combination is still performed for UE2, i.e., combining the buffered soft channel bits in the first transmission and the soft channel bits in the re-transmission, the combination gain cannot be obtained, but the SINR deterioration may be caused after combination. It can be seen that, in the NOMA system, the combination gain cannot be obtained in all cases. Hence, UE may determine in which case it is worth to perform data combination.

In the following, the relationship among the SINR after combination, the SINR when transmitting the first-transmitted data packet and the SINR when transmitting the re-transmitted data packet. Assume for the first transmission, the channel transfer function is given by expression (1), then SINR when transmitting the first-transmitted data packet is given by expression (2):

$$y_1 = h_1 s_1 + I_1 \qquad (1)$$

$$SINR_1 = \frac{|h_1|^2 P_{s_1}}{P_{I_1} + N} \qquad (2)$$

Assume for the re-transmission, the channel transfer function is given by expression (3), then SINR when transmitting the re-transmitted data packet is given by expression (4):

$$y_2 = h_2 s_2 + I_2 \qquad (3)$$

$$SINR_2 = \frac{|h_2|^2 P_{s_2}}{P_{I_2} + N} \qquad (4)$$

where $h_1$ and $h_2$ denote a channel transfer function when transmitting the first-transmitted data packet and when transmitting the re-transmitted the data packet, respectively; $s_1$ and $s_2$ denote a signal corresponding to the first-transmitted data packet and the re-transmitted data packet, respectively; $y_1$ and $y_2$ denote a received signal when first transmitting and when re-transmitting, respectively; $I_1$ and $I_2$ denote an interference signal when first transmitting and when re-transmitting, respectively; $P_{s_1}$ and $P_{s_2}$ denote power of a transmitted signal when first transmitting and when re-transmitting, respectively; $P_{I_1}$ and $P_{I_2}$ denote power of an interference signal when first transmitting and when re-transmitting, respectively; N denotes the power of noise.

Assume $P_{s_1} = P_{s_2} = P_s$ and ignore the power of noise N. At the UE side, after soft combining (e.g., Chase Combining), the SINR of combined signal is given by expression (5):

$$SINR_{cc} = \frac{(|h_1|^2 + |h_2|^2)^2 P_s}{|h_1|^2 P_{I_1} + |h_2|^2 P_{I_2}} \quad (5)$$

It can be seen that, if the combination gain is desired to obtain, a condition $SINR_{cc} \geq SINR_2$ is required to satisfy. In this case, by deducing the above-described expression, the condition is given by expression (6):

$$SINR_1 \geq \frac{|h_1|^2}{|h_1|^2 + 2|h_2|^2} SINR_2 \quad (6)$$

That is, when the condition given by expression (6) is satisfied, UE may perform data combination, otherwise, the UE should not perform data combination.

In order to simplify the condition given by expression (6), let $$\alpha = \frac{|h_1|^2}{|h_2|^2},$$

then the condition is given by expression (7):

$$SINR_1 \geq \frac{\alpha}{\alpha + 2} SINR_2 \quad (7)$$

That is, when the SINR of the first-transmitted data packet $SINR_1$ and the SINR of the re-transmitted data packet $SINR_2$ satisfies the above-described condition given by expression (7), the combination gain can be obtained, and UE may select to perform data combination.

Assume $|h_1|^2 = |h_2|^2$, the above-described expression may be further simplified. As a result, when $$SINR_1 \geq \frac{1}{3} SINR_2,$$

UE may select to perform data combination.

It should be noted that, in the above-described block 102, the UE may use some data combination methods to perform data combination, for example, maximal ratio combining, and equal gain combining.

Further, in the above-described method, if UE still fails to detect the re-transmitted data packet, it may request the second re-transmission, and then go back to perform block 101. If UE detects the re-transmitted data packet successfully, UE may delete the buffered information, and the data re-transmission procedure ends.

According to the above-described method, in the examples of the present disclosure, after the re-transmitted data packet is received, UE may first determine whether to perform data combination according to the SINR of the first-transmitted data packet and the SINR of the re-transmitted data packet, but not directly perform data combination, hence the result of deteriorated SINR after data combination may be avoided effectively.

In addition, UE may only buffer the information about channel status after the SIC operation, and the duration for buffering may be the whole data re-transmission procedure. For the data packet of other UEs detected successfully, UE may not store or just store in a limited duration, for example, only buffering the data packet of other UEs during one data re-transmission procedure, so that buffer space of UE may be greatly reduced.

Figure 4:
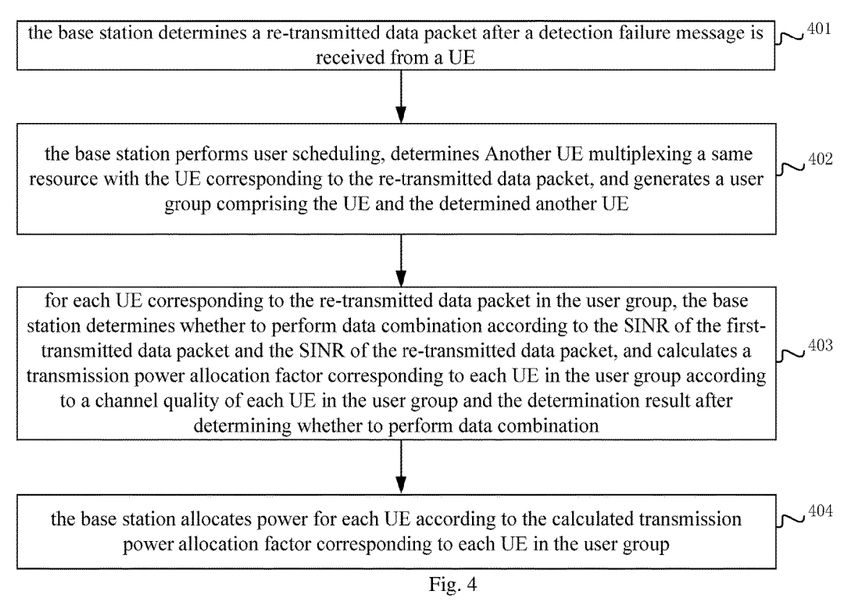
FIG. 4 is a flow chart illustrating a method for re-transmitting data at the base station side according to an example of the present disclosure.

In combination with accompanying drawings, a method for performing a downlink data re-transmission by a base station in a NOMA system will be described in detail. FIG. 4 is a flow chart illustrating a method for re-transmitting data at the base station side according to an example of the present disclosure. The method may be applied in downlink data transmission in a NOMA system.

In block 401, the base station determines a re-transmitted data packet after a detection failure message is received from a UE.

As described above, assume the base station transmits a downlink data packet at a time instant t, and then UE may feed back a detection success/failure message (e.g., ACK/NACK message) at a time instant t+4. If the base station receives a NACK message feed back from a UE, it indicates that the UE fails to detect the data packet transmitted by the base station at the time instant t, so the base station is required to re-transmit the data packet which is transmitted to this UE at the time instant t, thus the re-transmitted data packet is determined by the base station.

In block 402, the base station performs user scheduling, determines another UE multiplexing a same resource with the UE corresponding to the re-transmitted data packet, and generates a user group comprising the UE and the determined another UE.

In an example, the resource may refer to a subband. By pairing another UE with the UE corresponding to the re-transmitted data packet, the base station may list all the possible user groups as the candidate user groups, and then select one user group with a maximum scheduling metric from the candidate user groups as the final user group to be scheduled.

In block 403, for each UE corresponding to the re-transmitted data packet in the user group, the base station determines whether to perform data combination according to the SINR of the first-transmitted data packet and the SINR of the re-transmitted data packet, and calculates a transmission power allocation factor corresponding to each UE in the user group according to a channel quality of each UE in the user group and the determination result after determining whether to perform data combination.

In block 404, the base station allocates power for each UE according to the calculated transmission power allocation factor corresponding to each UE in the user group.

Figure 5:
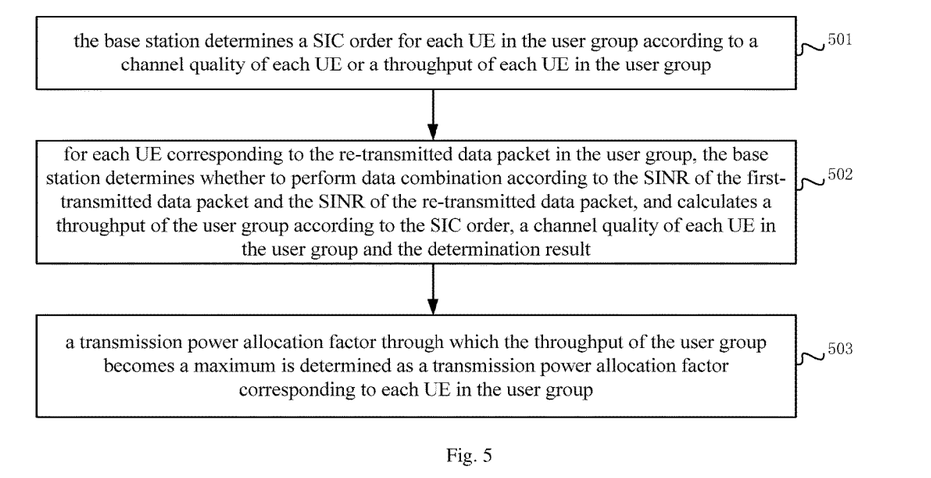
FIG. 5 is a flow chart illustrating a method for determining by the base station a transmission power allocation factor corresponding to each UE in the user group according to an example of the present disclosure.

In combination with FIG. 5, calculating by the base the station transmission power allocation factor corresponding to each UE in the user group in block 403 is described in detail in the following.

In block 501, the base station determines a SIC order for each UE in the user group according to a channel quality of each UE or a throughput of each UE in the user group.

In this block, the SIC order may be determined according to the ascending order of channel qualities (e.g., SINRs) or throughputs of all UEs in the user group. As an instance, the user group to be scheduled includes three users, i.e., UE1, UE2, and UE3, in which the channel quality of UE2 is the best, the channel quality of UE1 is in the middle, and the channel quality of UE3 is the worst, while the throughput of UE1 is a maximum, the throughput of UE2 is in the middle, and the throughput of UE3 is a minimum. If the SIC order is determined according to the ascending order of channel qualities, the SIC order for UEs in the user group is UE3, UE1 and UE2. If the SIC order is determined according to the ascending order of throughputs, the SIC order for UEs in the user group is UE3, UE2 and UE1.

In an example, the channel quality may be represented by a Channel Quality Indicator (CQI) of the UE.

In block 502, for each UE corresponding to the re-transmitted data packet in the user group, the base station determines whether to perform data combination according to the SINR of the first-transmitted data packet and the SINR of the re-transmitted data packet, and calculates a throughput of the user group according to the SIC order, a channel quality of each UE in the user group and the determination result.

In an example, the throughput of the user group may be a geometric mean throughput, a proportional fair scheduling metric or an improved proportional fair scheduling metric, etc.

Take the geometric mean throughput of the UE as an example to illustrate the method for calculating the throughput of the user group. If the throughput of the user group is represented by the geometric mean throughput of UEs in the user group, the throughput of the user group is given by expression (8):

$$Thr_{totle} = \sqrt[N]{\prod_{n=1}^{N} Thr_n} \qquad (8)$$

where $Thr_n$ denotes the throughput of the nth UE in the user group, which is given by expression (9), N denotes the total number of UEs in the user group.

$$Thr_n = BW_{SB} \times SE_n^{MCS} \times (1 - BLER_n^{MCS})|_{SINR_n} \qquad (9)$$

where $BW_{SB}$ denotes the bandwidth of a subband, $SE_n^{MCS}$ denotes the maximal spectrum efficiency achievable by the Modulation and Coding Scheme (MCS) supported by the nth UE under $SINR_n$, $BLER_n^{MCS}$ denotes the BLock Error Rate (BLER) when the maximal spectrum efficiency MCS of the nth UE is achieved under $SINR_n$, $SINR_n$ denotes the SINR of the nth UE, and $|_{SINR_n}$ denotes the premise under $SINR_n$. When calculating $SINR_n$, the SIC order is used to calculate the inter-user interference.

In the example, when calculating a throughput of the user group, besides the channel quality of each UE, it is determined whether to perform data combination for the re-transmitted data packet. When it is determined to perform data combination for the re-transmitted data packet, the SINR corresponding to each UE in the user group may be amended. For example, when calculating a throughput of each UE in the user group, the SINR of the nth UE $SINR_n$ may be determined as follows:

If the data packet transmitted to the nth UE is a first-transmitted data packet, the SINR of the nth UE $SINR_n$ refers to the SINR of the first-transmitted data packet, i.e., $SINR_n$ may be calculated by expression (10):

$$SINR_n = SINR_n^{inTx} \qquad (10)$$

If the data packet transmitted to the nth UE is a re-transmitted data packet, and it is determined that it is not required to perform data combination for the re-transmitted data packet (i.e., satisfying the condition $$SINR_n^{inTx} < \frac{\alpha}{\alpha + 2} SINR_n^{reTx}\Big),$$

the SINR of the nth UE $SINR_n$ may be calculated by expression (11):

$$SINR_n = SINR_n^{reTx} \qquad (11)$$

If the data packet transmitted to the nth UE is a re-transmitted data packet, and it is determined to perform data combination for the re-transmitted data packet (i.e., satisfying the condition $$SINR_n^{inTx} \geq \frac{\alpha}{\alpha + 2} SINR_n^{reTx}\Big),$$

the SINR of the nth UE $SINR_n$ may be amended by expression (12):

$$SINR_n = \frac{(\alpha + 1)^2 SINR_n^{reTx} \cdot SINR_n^{inTx}}{\alpha^2 SINR_n^{reTx} + SINR_n^{inTx}} \qquad (12)$$

In the above expressions (10), (11) and (12), $SINR_n^{inTx}$ denotes the SINR when transmitting the first-transmitted data packet corresponding to the nth UE, $SINR_n^{reTx}$ denotes the SINR when transmitting the re-transmitted data packet corresponding to the nth UE, $$\alpha = \frac{|h_1|^2}{|h_2|^2},$$

$h_1$ and $h_2$ denote a channel transfer function when transmitting the first-transmitted data packet and the re-transmitted data packet for the nth UE, respectively.

It can be seen that, when the base station determines the SINR corresponding to each UE in the user group, if the data packet transmitted to the nth UE is a re-transmitted data packet, and it is determined to perform data combination for the re-transmitted data packet, the SINR corresponding to the UE is required to be amended. The amended SINR is not only related to the SINR when transmitting the re-transmitted data packet, but also related to the SINR when first transmitting the data packet. Further, when the base station calculates the throughput of the user group, for the UE corresponding to a re-transmitted data packet for which data combination is performed, the amended SINR is used, i.e., when calculating the throughput of the user group, both the channel condition of the UE in the user group and a data combination gain of the re-transmitted data packet are considered.

In block 503, a transmission power allocation factor through which the throughput of the user group becomes a maximum is determined as a transmission power allocation factor corresponding to each UE in the user group.

It can be seen that, in the above-described example, when the base station allocates the transmission power for the re-transmitted data packet and another data packet, both the channel condition of each UE and whether to perform data combination for the re-transmitted data packet are considered. Hence, in the case of performing data combination, reducing the power for the UE corresponding to the re-transmitted data packet in some degree may not impact the data re-transmission performance, and at the same time the transmission power of another UE may be increased, so that the total system throughput may be enhanced.

Figure 6:
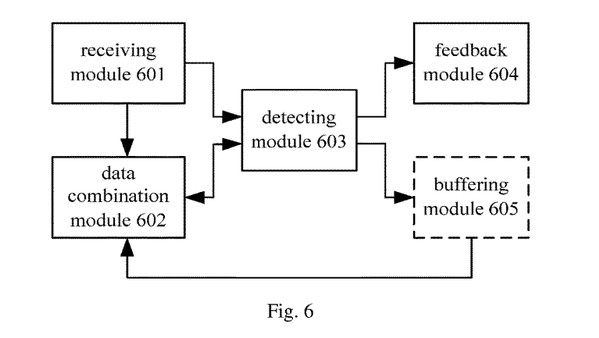
FIG. 6 is a schematic diagram illustrating a structure of a UE according to an example of the present disclosure.

Besides the method for re-transmitting data as described above, examples of the present disclosure also provide a UE and a base station performing the above-described methods. The structure of UE is shown in FIG. 6, comprising:

a receiving module 601, configured to receive a first-transmitted data packet or a re-transmitted data packet from a base station;

a data combination module 602, configured to for the re-transmitted data packet, determine whether to perform data combination according to a Signal to Interference-Noise Ratio (SINR) of the first-transmitted data packet and a SINR of the re-transmitted data packet; when it is determined to perform data combination, perform data combination for the re-transmitted data packet according to information buffered by the UE;

a detecting module 603, configured to detect the first-transmitted data packet from the receiving module 601, and detect the re-transmitted data packet according to a result of performed data combination from the data combination module 602; and a feedback module 604, configured to feed back a detection failure message to the base station when the detecting module 603 fails to detect a data packet; feed back a detection success message to the base station when the detecting module detects a data packet successfully.

In an example, the data combination module 602 may determine whether to perform data combination according to the method as described in block 101.

The UE may further comprise: a buffering module 605, configured to buffer information obtained when the detecting module 603 detects a data packet, such as the soft channel bits. The buffering module 605 may buffer the above-described soft channel bits until the whole data re-transmission procedure ends.

In an example, when the detecting module 603 does not detect the data packet of itself successfully, the buffering module 605 may not buffer the data packet of another UE which is detected successfully, or may buffer the data packet of another UE which is detected successfully before, but the buffering may happen only in a limited duration, for example, buffering the data packet until the first data re-transmission is finished.

It can be seen that, according to examples of the present disclosure, after the re-transmitted data packet is received, UE may first determine whether to perform data combination according to the SINR of the first-transmitted data packet and the SINR of the re-transmitted data packet, hence the result of deteriorated SINR after data combination may be avoided effectively.

In addition, UE may only buffer the soft channel bits after the SIC operation, and the duration for buffering may be the whole data re-transmission procedure. For the data packet detected successfully, UE may not store or just store in a limited duration, for example, only buffering the data packet during one data re-transmission procedure, so that buffer space of UE may be greatly reduced.

Figure 7:
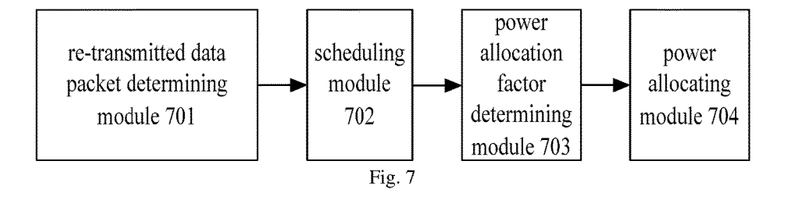
FIG. 7 is a schematic diagram illustrating a structure of a base station according to an example of the present disclosure.

The structure of a base station is shown in FIG. 7, comprising:

a re-transmitted data packet determining module 701, configured to determine a re-transmitted data packet after a detection failure message is received from a User Equipment (UE);

a scheduling module 702, configured to perform user scheduling, determine another UE multiplexing a same resource with the UE corresponding to the re-transmitted data packet, and generate a user group comprising the UE and the determined another UE;

a power allocation factor determining module 703, configured to for each UE corresponding to the re-transmitted data packet in the user group, determine whether to perform data combination according to a Signal to Interference-Noise Ratio (SINR) of a first-transmitted data packet and a SINR of the re-transmitted data packet, and calculate a transmission power allocation factor corresponding to each UE in the user group according to a channel quality of each UE in the user group and a determination result after determining whether to perform data combination; and a power allocating module 704, configured to allocate power for a data packet of each UE according to the calculated transmission power allocation factor corresponding to each UE in the user group.

Figure 8:
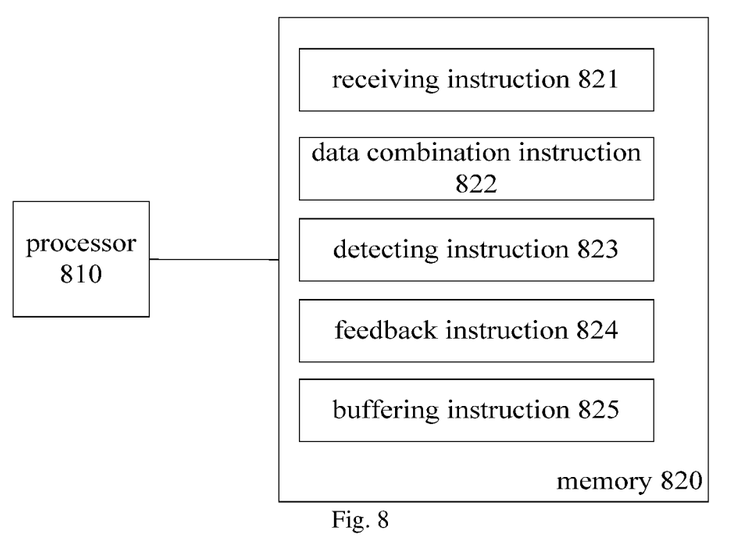
FIG. 8 is a schematic diagram illustrating a structure of a UE according to another example of the present disclosure.

FIG. 8 is a schematic diagram illustrating a structure of a UE according to another example of the present disclosure. As shown in FIG. 8, the UE comprises a processor 810 and a memory 820 communicated with the processor 810; in the memory 820, the instructions that are executed by the processor 810 are stored, comprising a receiving instruction 821, a data combination instruction 822, a detecting instruction 823 and a feedback instruction 824.

The receiving instruction 821 indicates to receive a first-transmitted data packet or a re-transmitted data packet from a base station.

The data combination instruction 822 indicates to for the re-transmitted data packet, determine whether to perform data combination according to a Signal to Interference-Noise Ratio (SINR) of the first-transmitted data packet and a SINR of the re-transmitted data packet; when it is determined to perform data combination, perform data combination for the re-transmitted data packet according to information buffered by the UE.

The detecting instruction 823 indicates to detect the first-transmitted data packet, and detect the re-transmitted data packet according to a result of performed data combination.

The feedback instruction 824 indicates to feed back a detection failure message to the base station when the data packet is failed to detect; feed back a detection success message to the base station when the data packet is detected successfully.

In an example, the memory 820 may further store a buffering instruction 825. The buffering instruction 825 indicates to buffer soft channel bits obtained when a data packet is detected.

Accordingly, the data combination instruction 822 indicates to when it is determined to perform data combination, combine the soft channel bits obtained when the first-transmitted data packet is detected and soft channel bits obtained when the re-transmitted data packet is detected.

Figure 9:
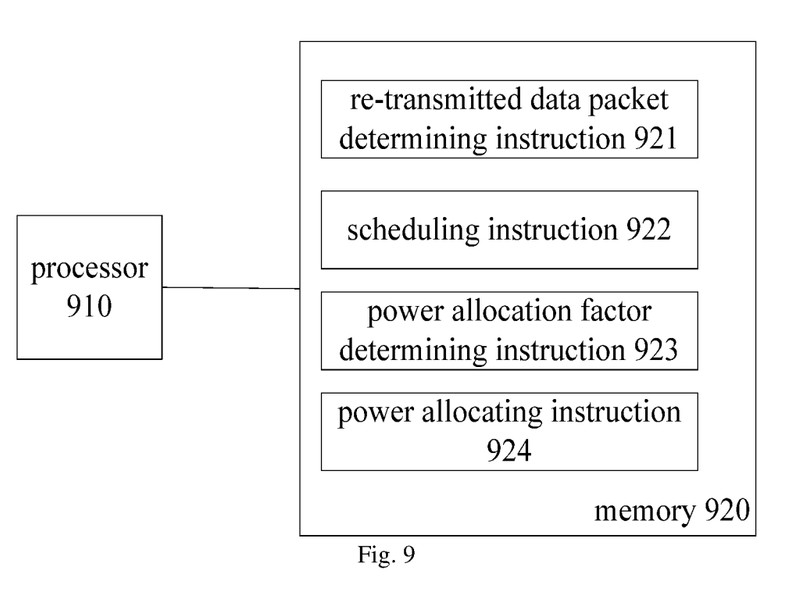
FIG. 9 is a schematic diagram illustrating a structure of a base station according to another example of the present disclosure.

FIG. 9 is a schematic diagram illustrating a structure of a base station according to another example of the present disclosure. As shown in FIG. 9, the base station comprises a processor 910 and a memory 920 communicated with the processor 910; in the memory 920, the instructions that are executed by the processor 910 are stored, comprising a re-transmitted data packet determining instruction 921, a scheduling instruction 922, a power allocation factor determining instruction 923 and a power allocating instruction 924.

The re-transmitted data packet determining instruction 921 indicates to determine a re-transmitted data packet after a detection failure message is received from a User Equipment (UE).

The scheduling instruction 922 indicates to perform user scheduling, determine another UE multiplexing a same resource with the UE corresponding to the re-transmitted data packet, and generate a user group comprising the UE and the determined another UE.

The power allocation factor determining instruction 923 indicates to for each UE corresponding to the re-transmitted data packet in the user group, determine whether to perform data combination according to a Signal to Interference-Noise Ratio (SINR) of a first-transmitted data packet and a SINR of the re-transmitted data packet, and calculate a transmission power allocation factor corresponding to each UE in the user group according to a channel quality of each UE in the user group and a determination result after determining whether to perform data combination.

The power allocating instruction 924 indicates to allocate power for a data packet of each UE according to the calculated transmission power allocation factor corresponding to each UE in the user group.

Operations indicated by these instructions are similar to the above-described corresponding modules, which are not described in detail herein.

It can be seen that, in the above-described example, when the base station allocates the transmission power for the re-transmitted data packet and another data packet, both the channel condition of each UE and whether to perform data combination for the re-transmitted data packet are considered. Hence, in the case of performing data combination, reducing the power for the UE corresponding to the re-transmitted packet in some degree may not impact the re-transmission performance, and at the same time the transmission power of another UE may be increased, so that the total system throughput may be enhanced.

The foregoing is preferred examples of the present disclosure, which is not used for limiting the protection scope of the present disclosure. Any modifications, equivalent substitutions and improvements made within the spirit and principle of the present disclosure, should be covered by the protection scope of the present disclosure.

What is claimed is:

1. A method for re-transmitting data, comprising:
   feeding back, by a User Equipment (UE), a detection failure message to a base station when the UE fails to detect a data packet;
   receiving, by the UE, a re-transmitted data packet from the base station;
   determining, by the UE, whether to perform data combination according to a Signal to Interference-Noise Ratio (SINR) of a first-transmitted data packet and a SINR of the re-transmitted data packet;
   when it is determined to perform data combination, performing, by the UE, data combination for the re-transmitted data packet according to information buffered by the UE and detecting the re-transmitted data packet according to a result of performed data combination; or
   when it is determined not to perform data combination, detecting, by the UE, the re-transmitted data packet;
   wherein determining whether to perform data combination according to the SINR of the first-transmitted data packet and the SINR of the re-transmitted data packet comprises:
   determining, by the UE, whether the SINR of the first-transmitted data packet and the SINR of the re-transmitted data packet satisfy the following condition; if the following condition is satisfied, it is determined to perform data combination:

$$SINR_1 \geq \frac{\alpha}{\alpha+2} SINR_2$$

wherein $SINR_1$, denotes the SINR of the first-transmitted data packet; $SINR_2$ denotes the SINR of the re-transmitted data packet;

$$\alpha = \frac{|h_1|^2}{|h_2|^2},$$

$h_1$ and $h_2$ denote a channel transfer function when transmitting the first-transmitted data packet and when transmitting the re-transmitted data packet, respectively.

2. The method of claim 1, wherein the information buffered by the UE comprises:
   soft channel bits obtained when the UE detects the first-transmitted data packet;
   performing data combination for the re-transmitted data packet according to the information buffered by the UE comprises:
   combining the soft channel bits obtained when the UE detects the first-transmitted data packet and soft channel bits obtained when the UE detects the re-transmitted data packet.

3. The method of claim 2, wherein the UE buffers the soft channel bits until a whole data re-transmission procedure ends.

4. The method of claim 2, further comprising:
   determining, by the UE, whether it is required to buffer a data packet of another UE which is detected successfully when the UE detects the first-transmitted data packet;
   wherein when it is determined that it is required to buffer the data packet of another UE, the information buffered by the UE further comprises: the data packet of another UE.

5. The method of claim 4, wherein the UE buffers the data packet of another UE until a first data re-transmission ends.

6. A method for re-transmitting data, comprising:
   determining, by a base station, a re-transmitted data packet after a detection failure message is received from a User Equipment (UE);
   transmitting, by the base station, the re-transmitted data packet to the UE; and determining, by the base station, whether to perform data combination according to a Signal to Interference-Noise Ratio (SINR) of a first-transmitted data packet and a SINR of the re-transmitted data packet;
   wherein determining whether to perform data combination according to the SINR of the first-transmitted data packet and the SINR of the re-transmitted data packet comprises:
   when a condition $$SINR_n^{inTx} < \frac{\alpha}{\alpha+2} SINR_n^{reTx}$$

is satisfied, determining not to perform data combination for the re-transmitted data packet;

when a condition $$SINR_n^{inTx} \geq \frac{\alpha}{\alpha+2} SINR_n^{reTx}$$

is satisfied, determining to perform data combination for the re-transmitted data packet;
wherein $SINR_n^{inTx}$ denotes the SINR of the first-transmitted data packet corresponding to the nth UE, $SINR_n^{reTx}$ denotes the SINR of the re-transmitted data packet corresponding to the nth UE, $$\alpha = \frac{|h_1|^2}{|h_2|^2},$$

$h_1$ and $h_2$ denote a channel transfer function when transmitting the first-transmitted data packet and the re-transmitted data packet for the nth UE, respectively.

7. The method of claim 6, further comprising:
performing, by the base station, user scheduling, determining another UE multiplexing a same resource with the UE corresponding to the re-transmitted data packet, and generating a user group comprising the UE and the determined another UE;
for each UE corresponding to the re-transmitted data packet in the user group, determining, by the base station, a transmission power allocation factor corresponding to each UE in the user group according to a channel quality of each UE in the user group and a determination result after determining whether to perform data combination; and
allocating, by the base station, power for a data packet of each UE according to the calculated transmission power allocation factor corresponding to each UE in the user group.

8. The method of claim 7, wherein determining the transmission power allocation factor corresponding to each UE in the user group according to a channel quality of each UE in the user group and the determination result after determining whether to perform data combination comprises:
determining a Sequential Interference Cancellation (SIC) order according to a channel quality of each UE or a throughput of each UE in the user group;
calculating a throughput of the user group according to the determined SIC order, a channel quality of each UE in the user group and the determination result;
determining a transmission power allocation factor through which the throughput of the user group becomes a maximum as a transmission power allocation factor corresponding to each UE in the user group.

9. The method of claim 8, wherein the throughput of the user group comprises one of a geometric mean throughput, a proportional fair scheduling metric or an improved proportional fair scheduling metric.

10. The method of claim 8, wherein calculating the throughput of the user group according to the determined SIC order, a channel quality of each UE in the user group and the determination result comprises:
when the nth UE corresponding to a first-transmitted data packet, calculating a SINR used for calculating a throughput of the nth UE by $SINR_n = SINR_n^{inTx}$;
when the nth UE corresponding to a re-transmitted data packet and it is determined not to perform data combination, calculating the SINR used for calculating a throughput of the nth UE by $SINR_n = SINR_n^{reTx}$;
when the nth UE corresponding to a re-transmitted data packet and it is determined to perform data combination, amending the SINR used for calculating a throughput of the nth UE by $$SINR_n = \frac{(\alpha+1)^2 SINR_n^{reTx} \cdot SINR_n^{inTx}}{\alpha^2 SINR_n^{reTx} + SINR_n^{inTx}},$$

wherein $$\alpha = \frac{|h_1|^2}{|h_2|^2},$$

$h_1$ and $h_2$ denote a channel transfer function when transmitting the first-transmitted data packet and the re-transmitted data packet for the nth UE, respectively.

11. A User Equipment (UE), comprising a memory and a processor communicating with the memory, the memory being configured to store instructions that when executed by the processor configure the user equipment to:
receive a first-transmitted data packet and a re-transmitted data packet from a base station;
for the re-transmitted data packet, determine whether to perform data combination according to a Signal to Interference-Noise Ratio (SINR) of the first-transmitted data packet and a SINR of the re-transmitted data packet; when it is determined to perform data combination, perform data combination for the re-transmitted data packet according to information buffered by the UE;
detect the first-transmitted data packet from the receiving module, and detect the re-transmitted data packet according to a result of performed data combination from the data combination module; and
feed back a detection failure message to the base station when the detecting module fails to detect a data packet; feed back a detection success message to the base station when the detecting module detects a data packet successfully;
wherein the instructions when executed by the processor further configure the user equipment to:
determine whether the SINR of the first-transmitted data packet and the SINR of the re-transmitted data packet satisfy the following condition; if the following condition is satisfied, it is determined to perform data combination:

$$SINR_1 \geq \frac{\alpha}{\alpha+2} SINR_2$$

wherein $SINR_1$ denotes the SINR of the first-transmitted data packet; $SINR_2$ denotes the SINR of the re-transmitted data packet;

$$\alpha = \frac{|h_1|^2}{|h_2|^2},$$

$h_1$ and $h_2$ denote a channel transfer function when transmitting the first-transmitted data packet and when transmitting the re-transmitted data packet, respectively.

12. The user equipment of claim 11, wherein the instructions when executed by the processor further configure the user equipment to:

buffer soft channel bits obtained when the detecting module detects a data packet;

wherein the data combination module is configured to when it is determined to perform data combination, combine the soft channel bits obtained when the detecting module detects the first-transmitted data packet and soft channel bits obtained when the detecting module detects the re-transmitted data packet.

* * * * *